Patented Oct. 24, 1922.

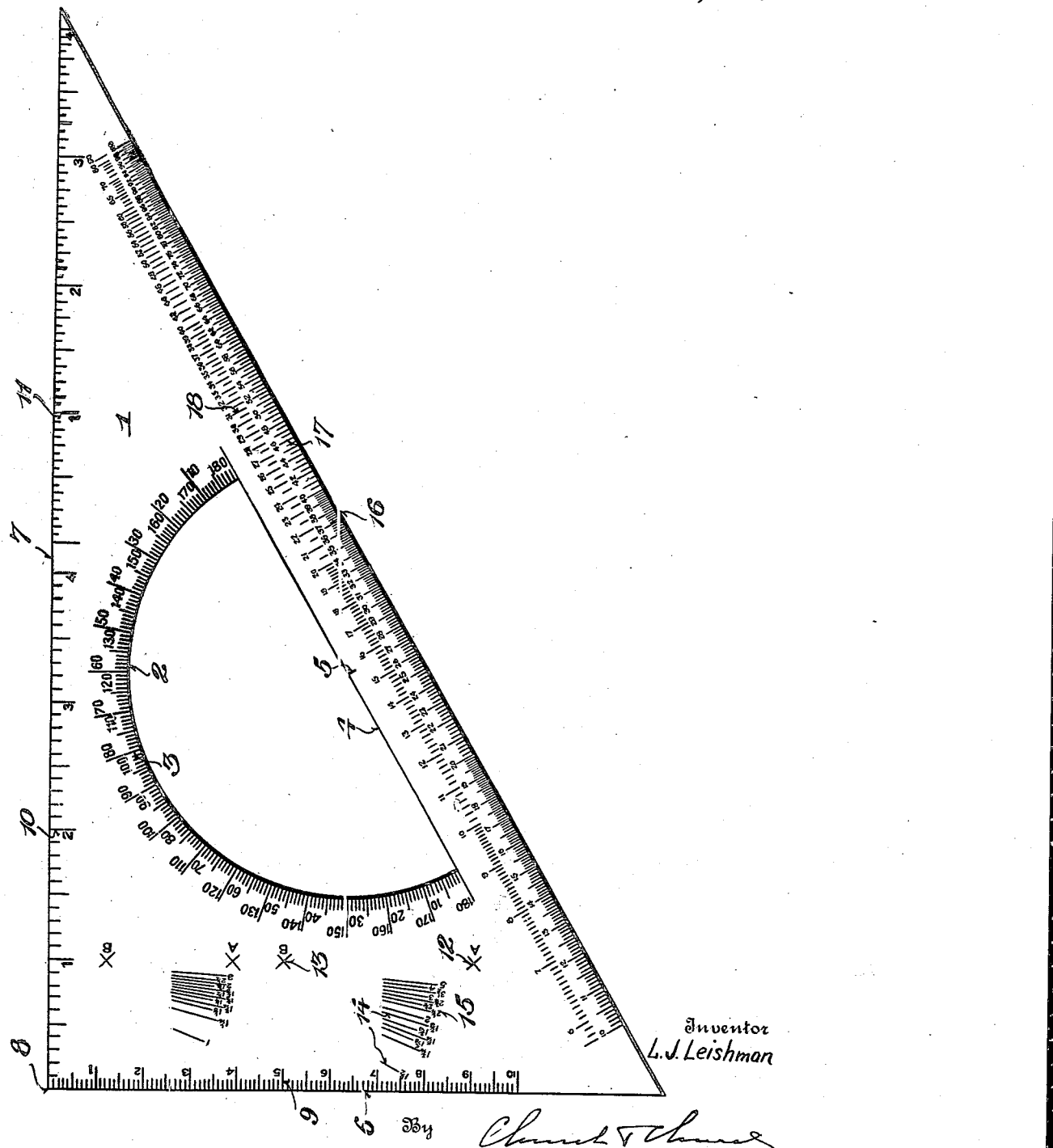

1,433,083

UNITED STATES PATENT OFFICE.

LE ROY J. LEISHMAN, OF OGDEN, UTAH.

COMPUTING INSTRUMENT.

Application filed December 18, 1917, Serial No. 207,778. Renewed September 15, 1922. Serial No. 588,482.

*To all whom it may concern:*

Be it known that I, LE ROY J. LEISHMAN, a citizen of the United States, residing at Ogden, in the county of Weber and State of Utah, have invented certain new and useful Improvements in Computing Instruments, of which the following is a full, clear, and exact description of the same, reference being had to the accompanying drawing, forming part of this specification.

This invention relates to an instrument for performing various mathematical operations, such as multiplication, division, finding diameters of circles, number of degrees in an arc, etc., and has for its general object the increase of utility in devices of this nature.

The drawing shows the preferred form of my device, which consists of a transparent right angle triangle 1 of xylonite or similar material, having a central semi-circular opening 2, the curved edge of which is graduated as at 3 into degrees, the graduations, running, as usual in both directions from the diameter 4 of the circle, this diameter forming the base of the opening 2, and having its center marked as at 5. The base 6, and altitude 7 of the triangle are each graduated in any desired way, beginning at the apex 8 of the right angle as for example, in centimeters 9, on the short edge, and in inches along the longer edge, the inches being sub-divided partly into tenths as at 10 and into sixteenths as at 11.

Between the centimeter scale and the central opening I provide means for ascertaining the diameter of the circle of which an arc is known. This consists of a pair of crosses 12 and 13 and a series of indicating lines 14 each corresponding to a certain sized circle, so that when the instrument is laid over a given arc so that the two crosses each rest directly on the arc, the diameter of the circle may be read directly in the scale 15, at the end of the line 14 which touches the arc. Preferably I provide a set of such means, consisting of two, as shown in the drawing, or a greater number if desired.

On the hypothenuse 16 of the triangle is shown a logarithmic scale 17 extending to the edge of the instrument, and a sine scale 18 between that and the base or diameter of the degree scale. These scales are used in finding the number of degrees in an arc, as follows; measure the chord (the distance from one end of the arc to the other, straight across) using either scale 10 or 11, and find the figure denoting this chord or base of the segment, upon the logarithmic scale 17. For example, let us suppose the given arc when placed under the points 12 and 13 rose to midway between the third and fourth line 14 from the bottom, indicating a diameter of $3\frac{1}{4}$ inches, and that the distance from tip to tip of the arc, when measured by scale 10 is shown to be 2.40 inches: Now find the point 240 on scale 17 corresponding to 2.40″ and place a pencil mark at such point and a similar pencil mark at 325 corresponding to the diameter $3\frac{1}{4}$″. Now move the arcascope slightly towards you, so that the marks will appear under the sine scale and to the left so that the pencil mark that was at 325 is now at 90 on the scale 18, and read the figure under the second mark, i. e. the one that was at 24. This figure will be found to be $47\frac{1}{2}$ which, multiplied by 2, gives 95° as the correct answer, the first figure, $47\frac{1}{2}$, indicating half the number of degrees in the arc.

I claim:

A straight edged flat sheet of transparent material having thereon two juxtaposed scales, one a logarithmic scale on said edge and the other a sine scale parallel thereto and so proportioned that the indications on the sine scale will represent the angles whose sines are represented by the indications of the logarithmic scale, whereby when marks are made on a flat surface in accordance with the logarithmic scale on said edge the sheet of transparent material may be shifted to make such marks visible in line with said sine scale.

LE ROY J. LEISHMAN.